May 12, 1970   M. L. HOCH ET AL   3,511,287
FORAGE HARVESTER DRIVE FOR FEED ELEMENTS
Filed Nov. 2, 1967   3 Sheets-Sheet 3
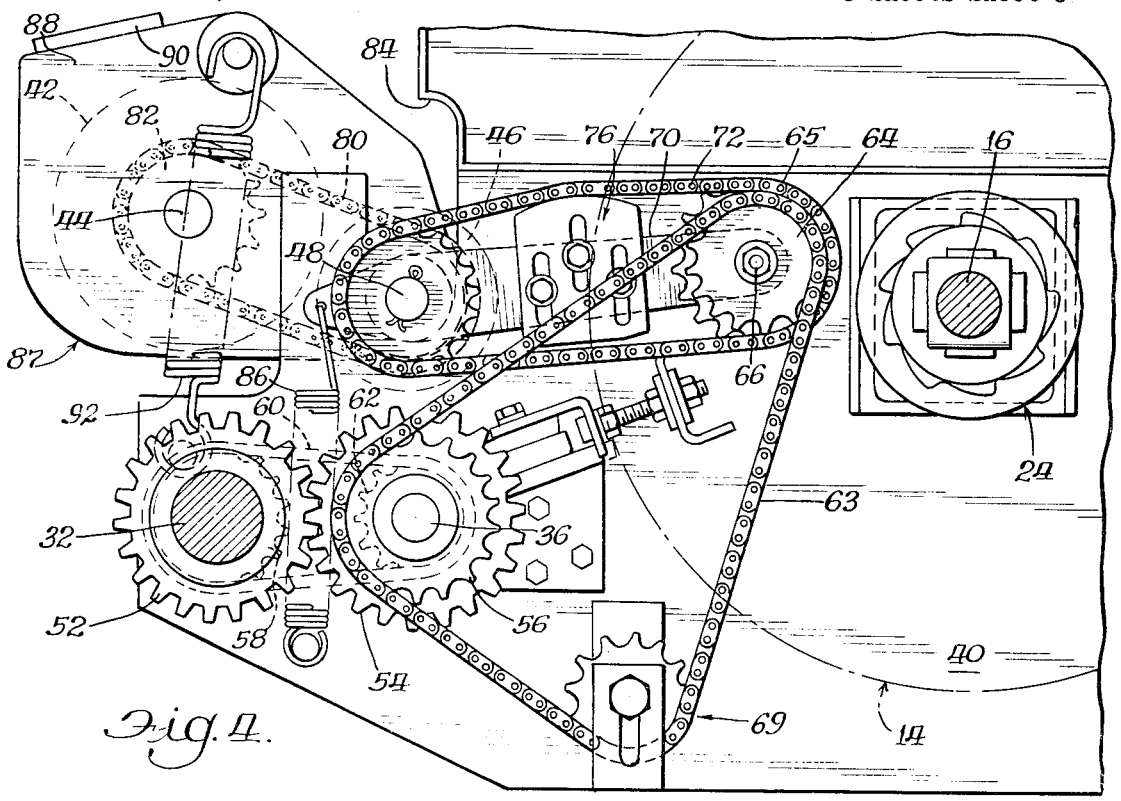
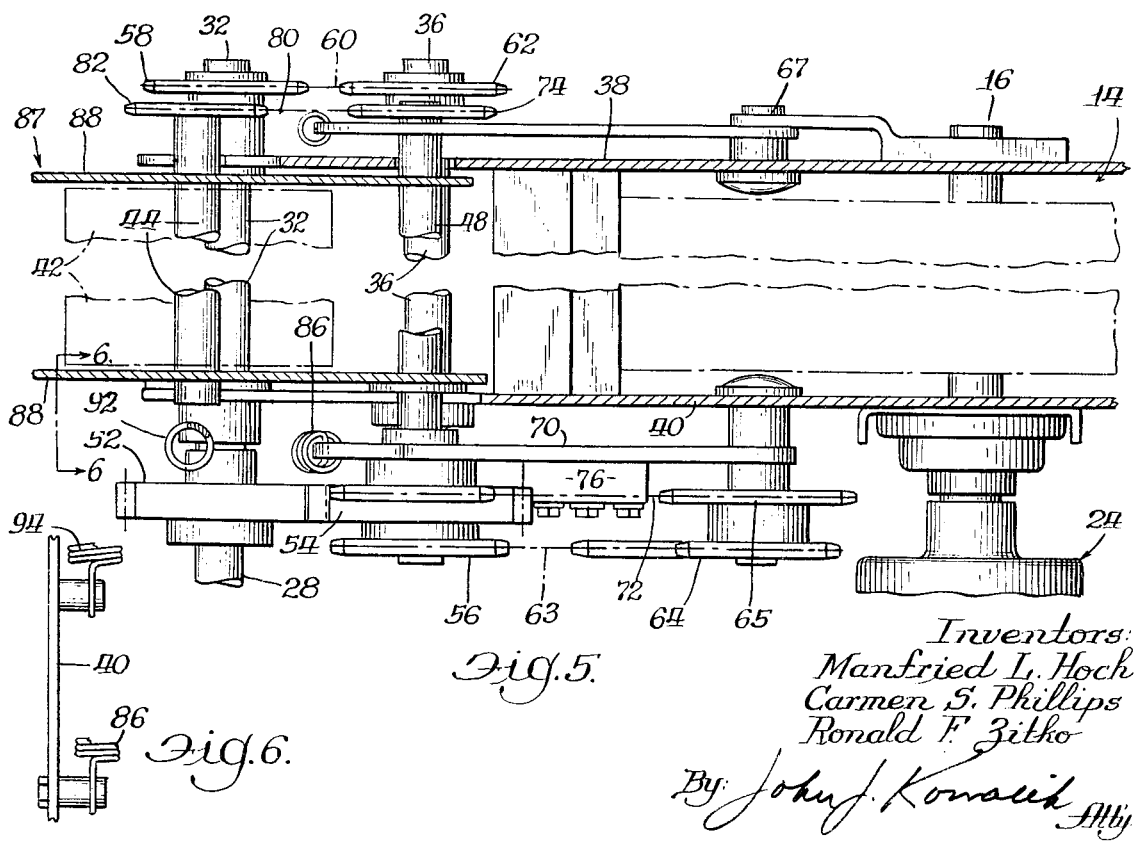
Inventors:
Manfried L. Hoch
Carmen S. Phillips
Ronald F. Zitko
By John J. Kowalik Atty United States Patent Office 3,511,287
Patented May 12, 1970

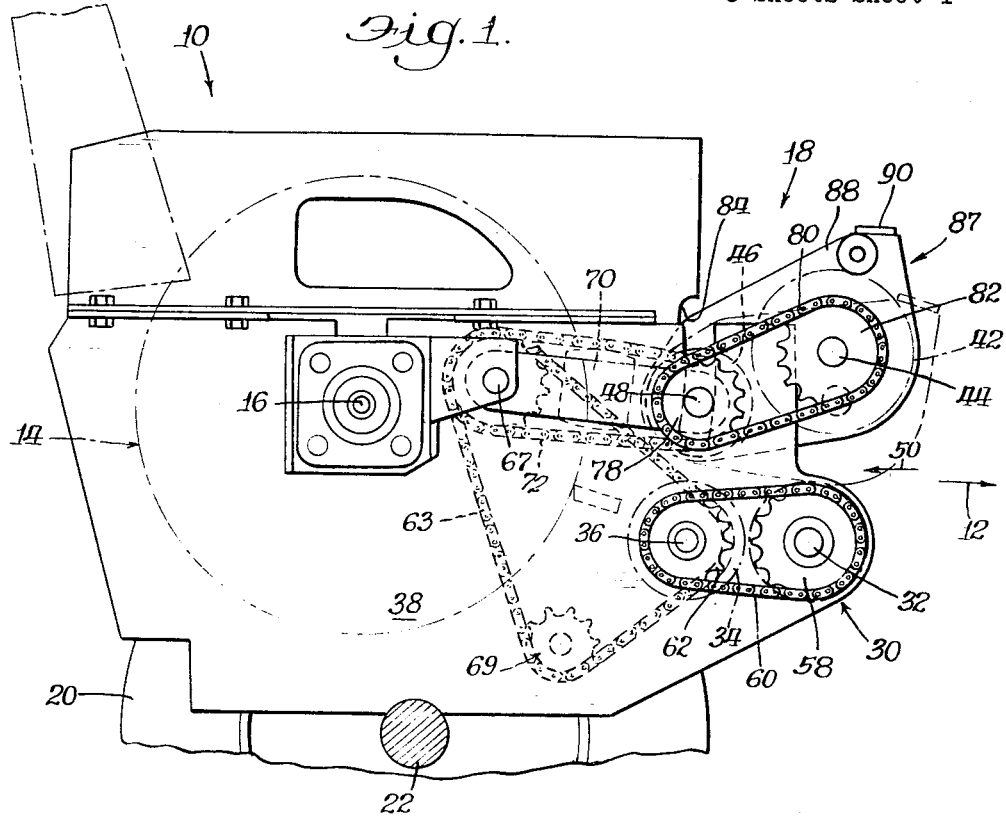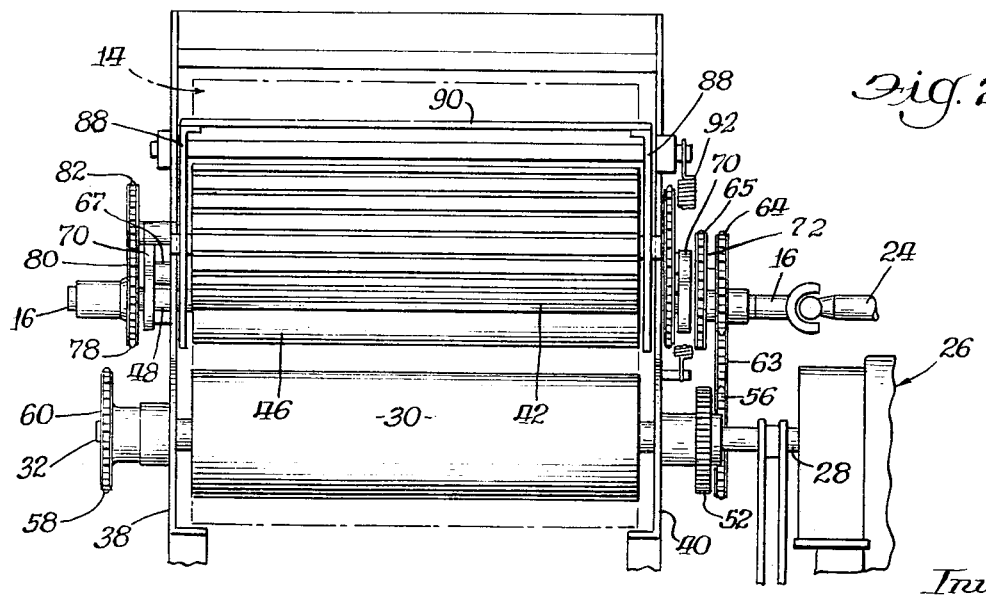

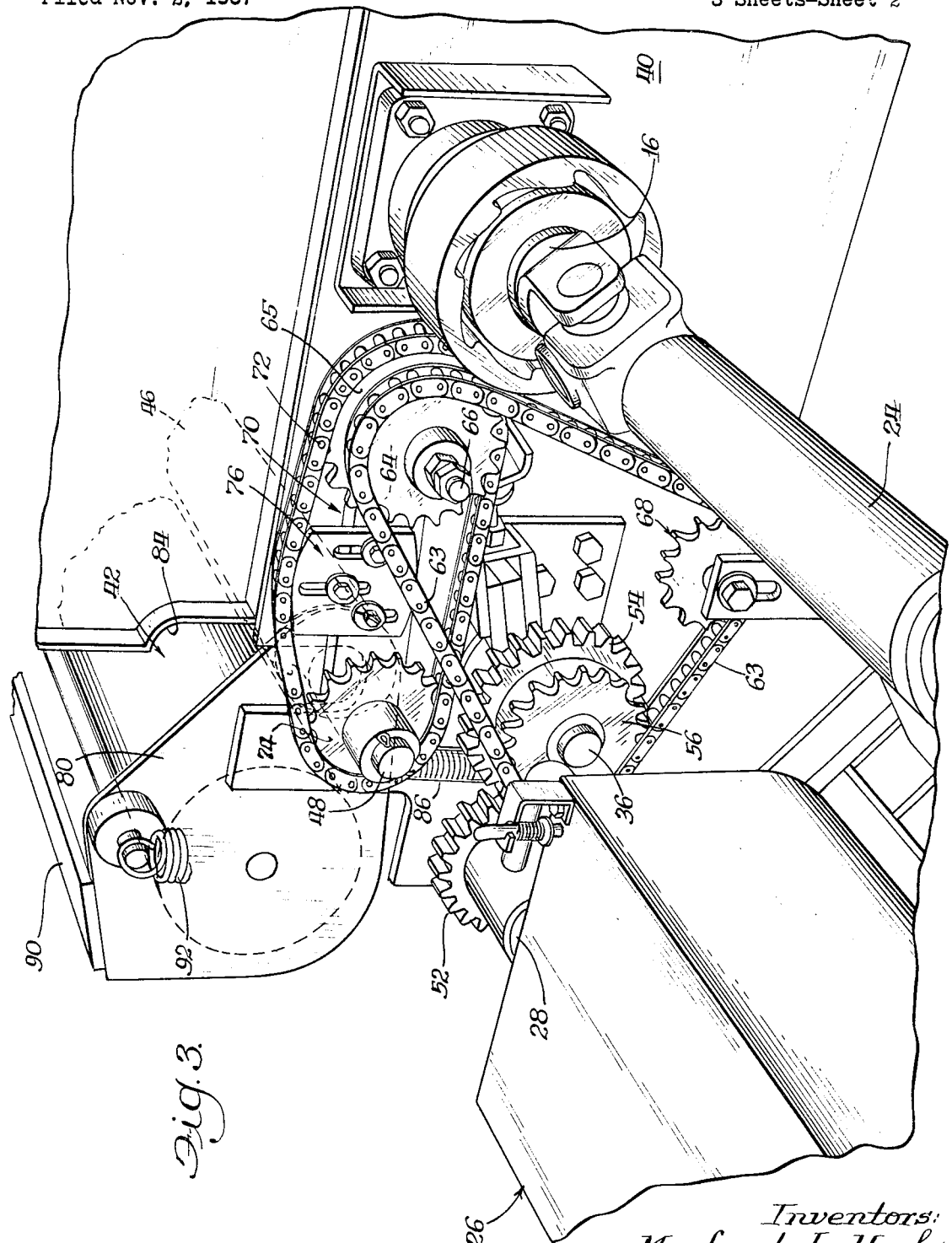

3,511,287
FORAGE HARVESTER DRIVE FOR
FEED ELEMENTS
Manfried L. Hoch, Lockport, and Carmen S. Phillips and Ronald F. Zitko, Downers Grove, Ill., assignors to International Harvester Company, Chicago, Ill., a corporation of Delaware
Filed Nov. 2, 1967, Ser. No. 680,120
Int. Cl. A01d 57/00
U.S. Cl. 146—120
9 Claims

ABSTRACT OF THE DISCLOSURE

A forage harvester having means for positively feeding crop plants from the gathering unit to the processing unit including rolls movable toward and from other rolls wherein the movable rolls are mounted for movement in arcs about fixed axes, the driving means being concentric with those axes, and the movable rolls remaining the same distance from the driving means.

BACKGROUND

The invention is particularly applicable to forage harvesters of the kind having a processing unit such as a chopper or cutter, and a gathering unit which cuts the standing crop, and feed the crop plants from the gathering unit to the processing unit.

Such feeding means usually includes two upper feed rolls and two lower feed rolls operating in opposite directions and defining a conveying path therebetween, the rolls serving to convey the crop plants through that path of the processing unit. The upper rolls are usually movable vertically, toward and from the bottom rolls, to accommodate variations in thickness of the mass aggregate of crop plants passing therebetween.

It has long been a serious problem to provide an effective drive for the movable rolls because of the variation in distance of the movable rolls from the drive means, due to ther movements.

SUMMARY OF THE INVENTION

The present invention is directed to novel means for driving the movable feed rolls of the kind referred to generally above.

A broad object of the invention is to provide novel drive means wherein the effective distance of the movable feed rolls from the drive members remains constant regardless of the movements of those feed rolls.

Another object is to provide drive means of the character referred to which includes drive elements, such as endless belts or chains interconnecting the feed rolls and drive members, wherein the movable feed rolls, in their movements, move in arcs concentric with the drive members.

Another and still more specific object is to provide an arrangement of the character just immediately referred to wherein the drive members include a fixed component, and the arrangement includes a first movable feed roll which is movable in an arc concentric with the fixed drive component, and a second movable feed roll movable in an arc concentric with the first movable feed roll and therefore movable in an irregular path, or series of arcs, due to the movement of the first feed roll from which it derives its drive.

Another object is to provide an arrangement of the general character referred to above which is more compact and less costly than other kinds of drives intended to perform the same end result.

Another object is to provide an arrangement of the character referred to which is readily adaptable to providing drives to the rolls at both sides of the harvester.

A further object is to provide an arrangement of the character referred to which includes gear sets and where in such gear sets can be mounted on presently known shafts or centers, whereby to eliminate the need for additional supports or shafts or bearings.

An additional object is to provide a device of the foregoing character which produces an unusual advantage in that the tangential reactive force on the movable feed rolls is directly proportional to the power applied to the movable feed rolls at any given speed of operation.

DESCRIPTION OF A PREFERRED EMBODIMENT OF THE INVENTION

FIG. 1 is a side view of a forage harvester of a kind to which the present invention is particularly adapted;

FIG. 2 is a front view of the harvester;

FIG. 3 is a perspective view of a portion of the forage harvester, from the side opposite that shown in FIG. 1, and taken at an angle from the rear, showing particularly certain components of the drive of the invention;

FIG. 4 is a large scale side view showing certain main components of the device but omitting certain elements of structure;

FIG. 5 is a top view; and

FIG. 6 is a detail view taken on line 6—6 of FIG. 4.

Referring now in detail to the accompanying drawings attention is directed first to FIG. 1 which shows a forage harvester indicated generally at 10 as viewed from the right side and oriented for travelling to the right as indicated by the arrow 12. FIG. 3 shows a portion of the same harvester as viewed from the left but slightly from the rear. The forage harvester is designed for cutting crop plants such for example as hay, and processing the plants such as by chopping or cutting them and delivering them to a suitable container or vehicle. The harvester includes a main processing unit indicated generally at 14 which as noted above may be a chopper or cutter which includes a shaft 16. It also includes or is associated with a gathering unit (not shown) disposed to the right as viewed in FIG. 1. Additionally, it includes feeding means indicated generally at 18 for feeding the cut crop plants from the gathering unit to the processing unit 14. The body of the harvester is supported by wheels 20 through an axle 22.

The shaft 16 of the chopper may be driven by a drive shaft 24 (FIGS. 2 and 3) from the draft implement such as a tractor while the feed unit may be driven from the tractor through a speed reducer or speed regulating gear case 26 having an output shaft 28, having driving connection with the feed unit as referred to hereinbelow.

The foregoing components and elements of the forage harvester are in general known and the present invention resides in certain features in the feed unit 18.

While it was stated above that the feed unit 18 includes rolls as feed elements, these feed elements may take forms other than rolls, such as continuous or endless chains, etc. In the present case, the rolls are representative of such different kinds of feed elements. In the present instance, the feed unit 18 includes a front lower roll 30 mounted on a shaft 32, and a rear lower roll 34 mounted on a shaft 36. The front lower roll appears in FIG. 2 and is indicated in dotted lines in FIG. 1; the rear lower roll is hidden from view in FIG. 2 but is indicated in dotted lines in FIG. 1. The shafts 32 and 36 are mounted in suitable bearnigs in side plates 38 and 40 (FIG. 2).

Also included in the feed unit 18 is a front upper roll 42 mounted on a shaft 44 and a rear upper roll 46 mounted on a shaft 48. The mounting of the shafts 44 and 48 will be described below. The front upper roll 42 shows in FIG. 2, while being indicated in dotted lines in FIG. 1 and partially indicated in FIG. 3; the rear upper roll 46 is hidden from view in FIG. 2 but is indicated in dotted lines in FIG. 1 and is partially indicated in FIG. 3. The rolls are provided with high-friction or gripping surfaces of suitable kind for engaging the crop plants and feeding them between the lower and the upper rolls through a path indicated at 50, and the rolls need not be further described from this standpoint.

The shaft 32 of the front lower roll has suitable driving connection with the output shaft 28 of the speed reducer 26. This connection includes a gear 52 keyed for rotation with those shafts, this gear meshing with another gear 54 mounted for free rotation on the shaft 36 of the rear lower roll. The gear 54 is included in a unit or assembly which includes a sprocket 56 for rotation with the gear, and of course freely rotatable on the shaft 36. On the opposite side of the harvester (FIGS. 1 and 2), the shaft 32 of the front lower roll is provided with a fixed sprocket 58 on which is trained an endless chain 60 which is also trained on another sprocket 62 fixed on the shaft 36 of the rear lower roll 34, for driving the two lower rolls in the same direction, which is counter-clockwise as viewed in FIG. 1, for conveying the crop plants rearwardly. The chains may be referred to also by the broader term belts, and the sprockets by the broader term pulleys.

On the near side of the harvester (FIG. 3) the drive is transmitted from the shaft 28 through the gear 52, the gear 54 and the sprocket 56, through an endless chain 63 which is trained on a sprocket 64 which with adjacent sprocket 65 forms a unit or assembly mounted for free rotation on a stud or pin 66 suitably mounted in the frame of the machine. A suitable tightener 68 may be provided for the chain 63. The stud 66 is co-axial with another stud 68 on the opposite side of the machine (FIG. 1) and these studs pivotally support radius arms 70 which in their other and swinging ends rotatably support the shaft 48 of the rear upper roll 44. Another endless chain 72 (FIG. 3) is provided on the near side, trained on the sprocket 65 and another sprocket 74 fixed on the shaft 48 of the rear upper roll. The chains 63 and 72 (FIG. 3) travel for rotating these sprockets in counterclockwise direction. A suitable tightener 76 may be provided on the radius arm 70 on the rear side of the harvester (FIG. 3) for the chain 72, this tightener being arranged for engaging the slack run of the chain and thus it may be rigid.

On the opposite side of the machine from that of FIG. 3 and as shown in FIG. 1, the shaft 48 of the rear upper roll is provided with a fixed sprocket 78 on which is trained an endless chain 80 which is also trained on another sprocket 82 fixed on the shaft 44 of the front upper roll, for driving the two upper rolls in the same direction.

The rear upper roll being mounted in the radius arms 70 is enabled to move upwardly to an upper limit as defined by shoulders 84 (FIGS. 1 and 3) in the frame of the machine engageable by the shaft 48 of that roll. Suitable spring means 86 (FIG. 4) is provided for biasing the rear upper roll downwardly, this biasing effect being of course increased by gravity.

The front upper roll 42 is incorporated in a vertically swinging unit indicated in its entirety at 87 which includes a pair of side plates 88 (which also act as arm) and preferably a top plate 90 secured in rigid assembly. The side plates, and thus the unit, are pivotally mounted on the shaft 44 of the rear upper roll and thus movable with that roll, and also swingably movable about that shaft as a pivot means. The front end of the unit 86 is biased downwardly by a suitable spring 92 (FIG. 4). The shaft 44 of the front upper roll is journalled in the side plates 88. Since the unit 86 moves about the shaft 48 as a pivot, the shaft 44 of the front roll moves in an arc concentric with the shaft 48, regardless of the movements of the latter shaft, and is always at the same distance from the shaft 48, and thus the drive chain 80 (FIG. 1) remains constantly of the same effective length. The same is true of the chain 72 on the opposite side (FIG. 3) since the rear upper roll is mounted in the radius arms 70 and regardless of the swinging movement of that roll, the sprocket 74 remains always at the same distance from the sprocket 64 constituting the drive member and therefore the chain 72 remains at the same effective length. Thus, the feed unit includes a pair of upper feed rolls which are both vertically movable toward and from the lower fixed feed rolls and regardless of such vertical movements, both of them remain constantly at the same distance from the drive members, in the one case the rear upper roll remains at the same distance from the fixed drive member 64 and the front upper roll remains at the same distance from its drive member although the latter is also movable. The construction is not limited to two movable rolls, but may include more than that number in series.

A great advantage of the arrangement is that spring loaded tighteners are eliminated, it being commonly known that such devices are not fully effective, sometimes yielding too greatly with corresponding ineffective control, and not providing the desired biasing effect on the crop plants being conveyed. In the present instance, fixed idlers or chain tighteners are used. Another great advantage is that the tangential reactive force through arms 70 on the upper feed elements is directly proportional to the power applied thereto at any given speed of operation. As is known, the crop plants form into masses which are not of uniform thickness, and oftentimes varying greatly in thickness due to irregular conditions of the standing crop and also due to the practical inconstancies in apparatus and the use thereof. The movability of the rolls is of course occasioned by such variations in thickness, but it is necessary also that the movable rolls bear downwardly on the moving crop plants to perform their feeding result, one of the purposes of the feeding means being to positively feed the plants into the processing unit. It has always been a serious difficulty, if not an actual impossibility, to maintain an effective pressure of the movable rolls on the plants so as to produce the positive feeding action under substantially all conditions. In some previous machines, such pressure has been produced that was satisfactory within a substantial range, but under some circumstances, such as excessively thick masses of plants, the pressure may become too great with consequent retardation of material flow. In the present case, the compressive force between the opposed rear rolls, which is represented by the component of the tangential reactive force which passes through the centers of both of the opposed rolls, is very nearly proportional to the amount of torque required by the upper feed elements, regardless of the speed of operation. The springs 86 and 92 exert substantially constant spring rates, this feature also aiding in maintaining the pressure against the crop plants substantially proportional to the thickness of the mass of crops being fed through the feeding unit.

Another advantage is that the device can easily be adapted to driving both the upper and lower rear rolls from either side of the harvester, or both sides if such should be desired.

An additional advantage is that the gears 52, 54 are mounted on existing shafts or centers, which eliminates the need for additional supports or shafts or bearings. A further advantage is that the device is substantially more compact and less costly than other known arrangements that are utilized for a similar end result in driving, those including for example unduly long universal joint assemblies and additional components required in connection therewith.

A further advantage is that the present arrangement eliminates the lateral forces, generally axial with shaft 48, which are generated by the frictional resistance to sliding in universal joint assemblies as they extend and retract to compensate for the changing position of the upper feed elements.

We claim:

1. In a forage harvester having a plant gathering unit, a plant processing unit, means for conveying plants from the gathering unit to the processing unit and including opposed upper and lower conveying assemblies engageable with plants therebetween and movable for so conveying the plants, the upper assembly comprising a plurality of spaced rollers, separate arm means pivotally interconnecting the rollers for independent vertical movement, drive transmitting means connecting adjacent rollers and interconnected to each other about the axes of the rollers whereby the rollers are capable of moving vertically without interrupting the drive.

2. The invention set out in claim 1 wherein the rollers move in arcs concentric with respective drive transmitting means.

3. The invention set out in claim 2 wherein the drive transmitting elements are in the form of endless belt means.

4. In a forage harvester having a plant gathering unit, a plant processing unit, means for conveying plants from the gathering unit to the processing unit and including opposed feed elements having portions engageable with plants therebetween and movable for so conveying the plants, certain of the feed elements being movable toward and from opposed feed elements, the improvement comprising means for driving the feed elements including drive members and drive transmitting elements interconnecting respective feed elements and drive members and means maintaining constant effective length of the drive transmitting elements regardless of the movement of the movable feed elements, and including a fixed drive member, a first feed element mounted on arms swingable about an axis through the fixed drive member, a second feed element mounted on arms swingable about an axis through the first feed element and parallel with the first axis.

5. A forage harvester of the character disclosed comprising a plant gathering unit, a plant processing unit, means for conveying plants from the gathering unit to the processing unit and including a pair of fixed lower rolls and a pair of upper rolls movable toward and from the lower rolls, the rolls of each pair being spaced along the line of conveyance of the plants, a drive shaft operatively connected with a first of the lower rolls, drive transmitting means interconnecting the lower rolls for driving them in the same direction, a first drive member driven by one of the lower rolls in the direction opposite that of its own direction, a fixed second drive member driven by the first drive member, drive transmitting means interconnecting the second drive member and a first of the upper rolls and between the upper rolls for driving the upper rolls in the same direction and opposite that of the lower rolls, and means for constantly maintaining a fixed distance between the second drive member and the first upper roll, and also between the upper rolls.

6. The invention set out in claim 5 wherein the second lower roll includes a shaft, and the first drive member is mounted on that shaft.

7. The invention set out in claim 6 wherein the first drive transmitting means between the lower rolls is disposed on one side of the harvester and the second drive transmitting means between the first roll and the first drive member is disposed on the opposite side of the harvester.

8. The invention set out in claim 7 wherein the second drive transmitting means includes a first gear mounted on the first lower roll and a second gear mounted on the shaft of the second lower roll, the second gear is incorporated in a unit with a sprocket, and a chain belt interconnects the sprocket and the second drive means.

9. A forage harvester of the character disclosed comprising a plant gathering unit, a plant processing unit, means for conveying plants from the gathering unit to the processing unit and including a pair of fixed lower rolls and a pair of upper rolls movable toward and from the lower rolls, the rolls being engageable with plants between the lower and upper rolls in so conveying the plants and the rolls of each pair being spaced along the line of conveyance of the plants, first arms pivoted on a first axis mounting the first upper roll in their swinging ends, second arms pivoted on a second axis constituting the axis of the first upper roll mounting the second upper roll in their swinging ends, a drive shaft operatively connected with a first of the lower rolls on a near side of the harvester, belt means on the far side of the harvester operatively interconnecting the lower rolls for driving them in the same direction, a gear on the near end of the first lower roll, the second lower roll having a shaft, a first drive unit freely rotatable on the near end of the shaft of the second lower roll, the first drive unit including a gear in mesh with the gear on the first roll and a first pulley, a second drive unit fixed in position on the near side on said first axis and including a second and a third pulley for rotation in unison, belt means operatively interconnecting the first and second pulleys for rotation in the same direction, a fourth pulley on the near end of the first upper roll, belt means operatively interconnecting the third and fourth pulleys for rotation in the same direction, belt means operatively interconnecting the upper rolls on the far side of the harvester for rotation of the rolls in the same direction.

References Cited

UNITED STATES PATENTS 2,775,991    1/1957    Elliott _____ 146—109 X
3,195,595    7/1965    Corwith et al. _____ 146—120

W. GRAYDON ABERCROMBIE, Primary Examiner